US010186048B2

(12) United States Patent
Hsu (10) Patent No.: US 10,186,048 B2
(45) Date of Patent: Jan. 22, 2019

(54) OBJECT DISTANCE COMPUTING METHOD AND OBJECT DISTANCE COMPUTING APPARATUS

(71) Applicant: PixArt Imaging Inc., Hsin-Chu (TW)

(72) Inventor: En-Feng Hsu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 519 days.

(21) Appl. No.: 14/937,884

(22) Filed: Nov. 11, 2015

(65) Prior Publication Data
US 2016/0314372 A1 Oct. 27, 2016

(30) Foreign Application Priority Data
Apr. 27, 2015 (TW) .............................. 104113414 A (51) Int. Cl.
*G06T 7/60* (2017.01)
*G06T 7/571* (2017.01)

(52) U.S. Cl.
CPC ............. *G06T 7/60* (2013.01); *G06T 7/571* (2017.01); *G06T 2207/10024* (2013.01); *G06T 2207/20221* (2013.01)

(58) Field of Classification Search
CPC . G06T 7/60; G06T 7/571; G06T 2207/10024; G06T 2207/20221
See application file for complete search history.

(56) References Cited

U.S. PATENT DOCUMENTS

| 2013/0051673 | A1* | 2/2013 | Wernersson | G06T 7/11 382/173 |
|---|---|---|---|---|
| 2013/0222577 | A1 | 8/2013 | Yamanaka | |
| 2013/0278817 | A1 | 10/2013 | Ikemoto | |
| 2014/0198188 | A1 | 7/2014 | Izawa | |
| 2015/0104076 | A1 | 4/2015 | Hayasaka | |
| 2015/0222808 | A1* | 8/2015 | Nguyen | H04N 5/23212 348/349 |
| 2015/0310605 | A1* | 10/2015 | Choi | G06T 7/571 348/135 |
| 2015/0347821 | A1* | 12/2015 | Choi | H04N 5/2257 345/156 |

(Continued)

FOREIGN PATENT DOCUMENTS

| CN | 103379277 A | 10/2013 |
|---|---|---|
| CN | 103453881 A | 12/2013 |
| CN | 103777741 A | 5/2014 |

(Continued)

*Primary Examiner* — Mekonnen D Dagnew
(74) *Attorney, Agent, or Firm* — Winston Hsu (57) ABSTRACT

An object distance computing method, applied to an image sensor comprising a plurality of first type pixels. The first type of pixels comprises a first group and a second group of first type pixels. The method comprises: blocking a first part for each pixel for the first group of first type pixels, and blocking a second part for each pixel for the second group of first type pixels; retrieving a first image of an object via a non-blocked part of each pixel for the first group of first type pixels; retrieving a second image of an object via a non-blocked part of each pixel of the second group of first type pixels; combining the first image and the second image to generate a first combined image; and computing first distance information for the object and the image sensor according to a blur level of the first combined image.

14 Claims, 10 Drawing Sheets

(56) References Cited

U.S. PATENT DOCUMENTS

2018/0205933 A1* 7/2018 Aflaki Beni ......... G02B 27/017

FOREIGN PATENT DOCUMENTS

| CN | 103828361 A | 5/2014 |
| CN | 103856772 A | 6/2014 |
| JP | 2011-95027 A | 5/2011 |
| TW | 201441713 A | 11/2014 |

* cited by examiner

OBJECT DISTANCE COMPUTING METHOD AND OBJECT DISTANCE COMPUTING APPARATUS

BACKGROUND OF THE INVENTION

1. Field of the Invention

The present invention relates to an object distance computing method and an object distance computing apparatus, and particularly relates to an object distance computing method and an object distance computing apparatus which can increase a computable range for the object distance information.

2. Description of the Prior Art

Figure 1A:
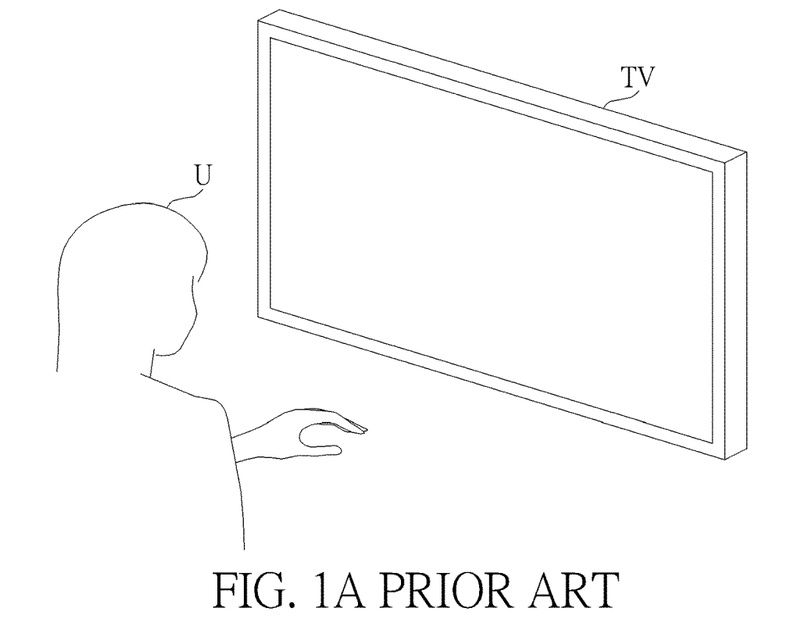
FIG. 1A and FIG. 1B are schematic diagrams illustrating the user performs a complicated gesture to a conventional TV.
Figure 1B:
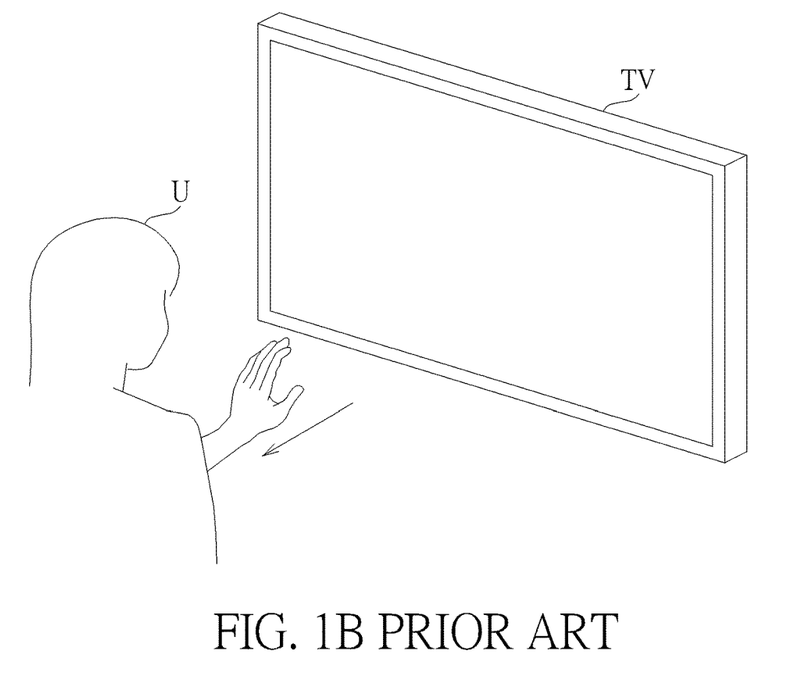

In recent years, a smart electronic apparatus becomes more and more popular. Besides the smart phone and the tablet computer, the smart TV is a popular smart electronic apparatus as well. Comparing with a traditional TV, a user can use a gesture to control a smart TV rather than use a remote controller. For a smart phone and a tablet computer, the gesture is directly performed on a surface thereof. However, for a smart TV, the gesture is always performed at a location which is not very close the smart TV. In such case, in order to accurately detect a complicated gesture, 3D image detection becomes very important. For example, in FIG. 1A, the user U performs a "grabbing" gesture. For another example, in FIG. 1B, the user U opens his hand and moving the hand back. It is hard to determine such gesture if the 3D image detection is not performed.

Different from a normal plane image, the 3D image detection needs a distance parameter. Accordingly, the 3D image detection has a mechanism for detecting an object distance. Conventionally, the mechanism for detecting an object distance is applying a light source to emit light, and computing the object distance based on the light reflected from the object. For such apparatus, the cost is high and the size is large, since the light source and the apparatus for controlling the light source and for receiving reflected light must be included.

SUMMARY OF THE INVENTION

Accordingly, one objective of the present invention is to provide an object distance computing method and an object distance computing apparatus.

One embodiment of the present invention discloses an object distance computing method, applied to an image sensor comprising a plurality of first type pixels. The first type pixels comprise a first group of first type pixels and a second group of first type pixels. The object distance computing method comprises: blocking a first part for each the first type pixel of the first group of first type pixels, and blocking a second part for each the first type pixel of the first group of first type pixels; capturing a first image of an object via a non-blocked part for each the first type pixel of the first group of first type pixels; capturing a second image of the object via a non-blocked part for each the first type pixel of the second group of first type pixels; and computing first distance information between the object and the image sensor, according to at least one blur level for at least one of the first image, the second image and a first combined image generated by combining the first image and the second image.

Another embodiment of the present invention discloses an object distance computing apparatus, which comprises an image sensor and a control unit. The image sensor comprises: a plurality of first type pixels, comprising a first group of first type pixels and a second group of first type pixels; and a block layer, configured to block a first part for each the first type pixel of the first group of first type pixels, and configured to block a second part for each the first type pixel of the first group of first type pixels. The image sensor captures a first image of an object via a non-blocked part for each the first type pixel of the first group of first type pixels, captures a second image of the object via a non-blocked part for each the first type pixel of the second group of first type pixels, and combines the first image and the second image to generate a first combined image. The control unit computes first distance information between the object and the image sensor according to at least one blur level for at least one of the first image, the second image and a first combined image generated by combining the first image and the second image.

Another embodiment of the present invention discloses an object distance computing method applied to an object distance computing apparatus comprising an image sensor and a movable lens. A distance between the movable lens and the image sensor is a first distance. The object distance computing method comprises: applying the image sensor to capture a first sensing image of an object via the movable lens; computing first distance information between the object and the image sensor according to a blur level of the first sensing image; adjusting a location of the movable lens according to the blur level of the first sensing image such that a distance between the movable lens and the image sensor is a second distance, and applying the image sensor to capture a second sensing image of the object; and computing second distance information between the object and the image sensor according to a blur level of the second sensing image.

Another embodiment of the present invention discloses an object distance computing apparatus, which comprises: a movable lens; an image sensor, having a first distance away from the movable lens, configured to capture a first sensing image of an object via the movable lens; a lens driver; a control unit, configured to compute first distance information between the object and the image sensor according to a blur level of the first sensing image. The control unit further adjusts a location of the movable lens according to the blur level of the first sensing image such that a distance between the movable lens and the image sensor is a second distance. The control unit controls the image sensor to capture a second sensing image of the object via the movable lens, and computes second distance information between the object and the image sensor according to a blur level of the second sensing image.

In view of above-mentioned embodiments, the present invention applies the conventional focus mechanism to compute a distance. By this way, the distance information for the object can be computed without other devices and other complicated computing. Additionally, the computable range for the object distance information can be extended if more than one type of pixels are applied to compute distance information. Further, the computable range for the object distance information can be extended if the location for the movable lens is adjusted according to a blur level for the image.

These and other objectives of the present invention will no doubt become obvious to those of ordinary skill in the art after reading the following detailed description of the preferred embodiment that is illustrated in the various figures and drawings.

DETAILED DESCRIPTION

In the following, different embodiments will be provided to explain the distance detecting method provided by the present invention. Related information for "phase detection" will be explained first, since the object distance computing method provided by the present invention is related with "phase detection" for an image.

A conventional camera needs to perform a focus operation before captures an image for an object to capture a clear image. A focus operation can be classified as a manual focus operation or an auto focus operation. Many methods can be applied to perform an auto focus operation, one of which is "phase detection".

Figure 2:
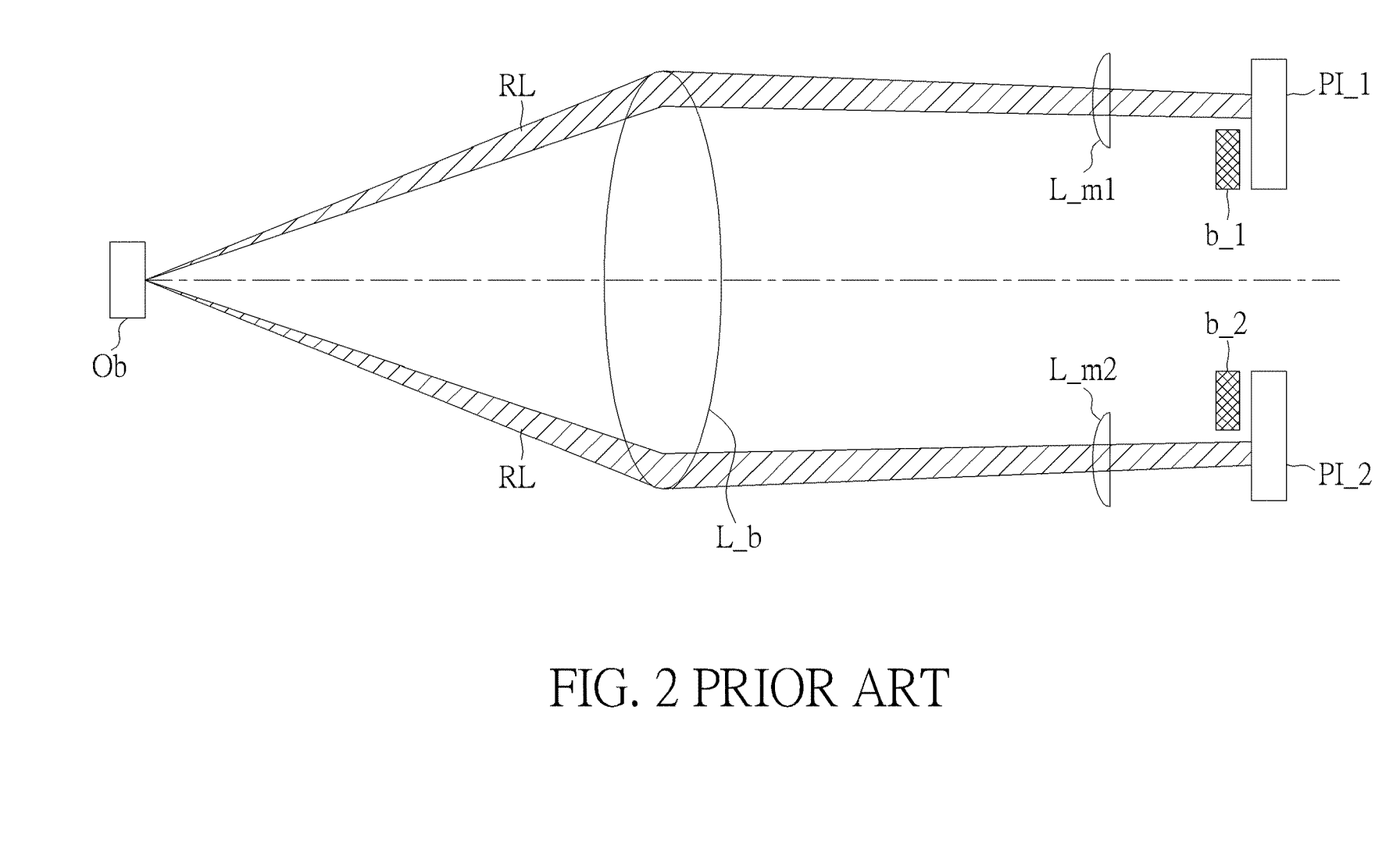
FIG. 2 is a schematic diagram illustrating "phase detection" to perform a conventional focus operation.

FIG. 2 is a schematic diagram illustrating applying "phase detection" to perform a conventional focus operation. As shown in FIG. 2, the light RL reflected by the object Ob enters the micro lenses L_m1, L_m2, after refracted by the large lens L_b. After refracted by the micro lenses L_m1, L_m2 again, the light captured by pixels PI_1, PI_2 to generate an image signal. A part for each pixel of pixels PI_1, PI_2 is blocked by block layers b_1, b_2. However, another part for each pixel of pixels PI_1, PI_2 is not blocked and respectively generates a first image (by PI_1) and a second image (by PI_2) according to received light that is reflected from the object Ob. The first image and the second image are combined to generate a combined image. If the object Ob is at the focus point, the combined image is a clear image. However, if the object is not at the focus point, the combined image is a blurred image (i.e. the first image and the second image have a phase difference). Accordingly, the camera can perform an auto focus operation according to a blur level of the combined image.

Figure 3:
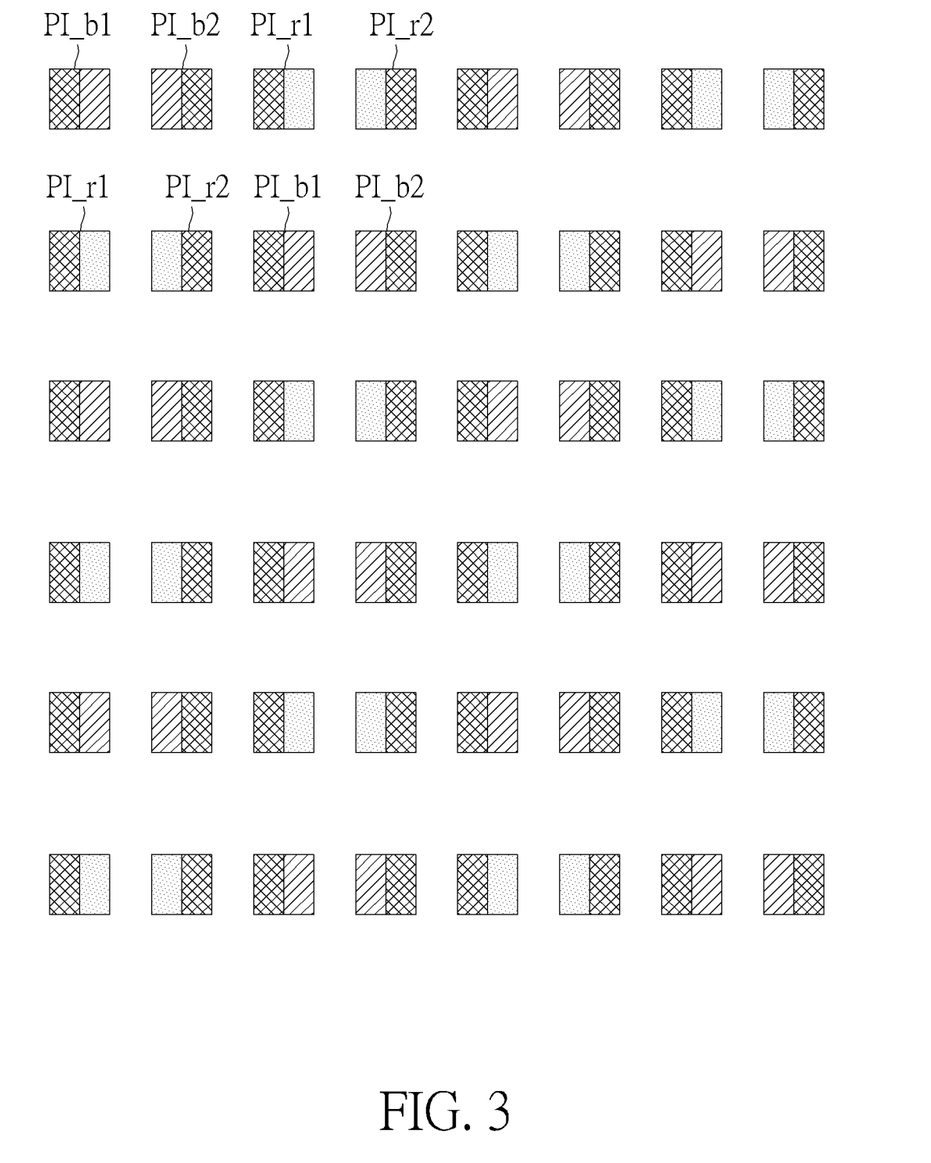
FIG. 3 and FIG. 4 are schematic diagrams illustrating computing an object distance via "phase detection", according to one embodiment of the present invention.
Figure 4:
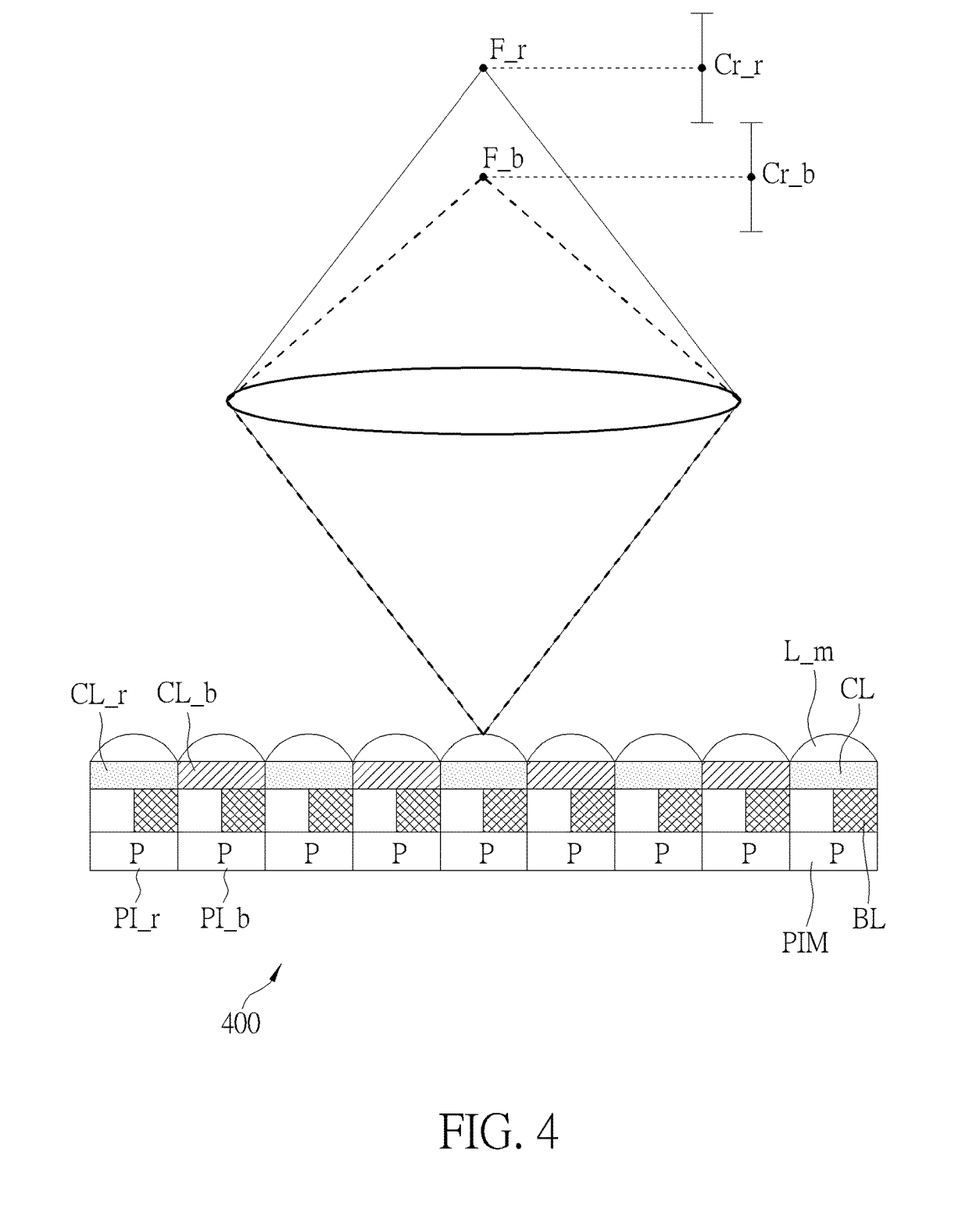

FIG. 3 and FIG. 4 are schematic diagrams illustrating computing an object distance via "phase detection", according to one embodiment of the present invention. As depicted in FIG. 3, the image sensor comprises a plurality of R pixels (red pixel) PI_r1, PI_r2 and a plurality of B pixels (blue pixel) PI_b1, PI_b2. Please note only some R pixels and B pixels are marked by symbols for the convenience of understanding. The R pixels can be classified into first group of R pixels PI_r1 and a second group of R pixels PI_r2 (but not limited). Similarly, B pixels can be classified into first group of B pixels PI_b1 and a second group of B pixels PI_b2. According to FIG. 3, left half parts of the first group of R pixels PI_r1 are blocked, thus only right half parts thereof can sense images. On the opposite, right half parts of the second group of R pixels PI_r2 are blocked, thus only left half parts thereof can sense images. The first group of R pixels PI_r1 generates a first image, and the second group of R pixels PI_r2 generates a second image. The first image and the second image can be combined to generate a first combined image. As above-mentioned, the combined image is clear if the object is at the focus point. Accordingly, first distance information between the object and the image sensor can be computed according to a blurred level of the first combined image. In another embodiment, at least one blur level for at least one of the first image and the second image can be applied to compute the first distance information between the object and the image sensor. In the following embodiments, the combined image is taken for an example to explain the present invention. However, it does not mean to limit.

Similarly, left half parts of the first group of B pixels PI_b1 are blocked, thus only right half parts thereof can sense images. On the opposite, right half parts of the second group of B pixels PI_b2 are blocked, thus only left half parts thereof can sense images. The first group of B pixels PI_b1 generates a third image, and the second group of B pixels PI_b2 generates a fourth image. The third image and the fourth image can be combined to generate a second combined image. As above-mentioned, the combined image is clear if the object is at the focus point. Accordingly, second distance information between the object and the image sensor can be computed according to a blurred level of the second combined image.

Please note, the phase detection is not limited to be performed via blocking the left half part for each pixel of the first group of pixels and blocking right half part for each pixel the second group of pixels. The phase detection can be performed via blocking different parts for each pixel of the first group of pixels and for each pixel of the second group of pixels. For example, the upper half part for each pixel of the first group of pixels and the lower half part for each pixel the second group of pixels can be blocked to perform phase detection (i.e. blocking different half parts). In another embodiment, different parts, which are smaller than a half part, for each pixel of the first group of pixels and for each pixel the second group of pixels can be blocked to perform phase detection In one embodiment, only one type pixel is applied to compute distance information, for example, only R pixels or only B pixels. In another embodiment, two types of pixels are applied to compute distance information, thereby a computable range for the object can be increased. Please refer to FIG. 4, the focus point for blue light is at F_b, thus the computable range thereof is Cr_b. That is, if the object is outside the computable range Cr_b, the second combined image captured by the image sensor is too far such that the distance information for the object cannot be computed. Also, the focus point for red light is at F_r, thus the computable range thereof is Cr_r. Accordingly, if the R pixel is also applied to compute distance information, the distance information can be computed once the object is in the computable range Cr_b and Cr_r. By this way, a computable range larger than which of a single type pixel can acquired.

In the embodiment of FIG. 4, either the first distance information or the second distance information can be selected as abasement for determining a distance between the object and the image sensor. In one embodiment, a compensation level for compensating the first combined image to a clear image and a compensation level for compensating the second combined image to a clear image are respectively acquired, and the first distance information or the second distance information is selected as a basement for determining a distance between the object and the image sensor according to the compensation levels. That is, the first distance information or the second distance information is selected as the basement according to blur levels for the first combined image and the second combined image. For example, distance information corresponding to a clearer image is selected as a basement for determining a distance between the object and the image sensor.

Please refer to FIG. 4 again, which is a schematic diagram illustrating a structure for an image sensor 400 corresponding to FIG. 3. The image sensor 400 comprises a pixel matrix PIM, a block layer BL, a light filter layer CL and a micro lens layer L_m. The pixel matrix PIM comprises a plurality of pixels, and the block layer BL is applied to block pixels as depicted in FIG. 3. The light filter layer CL only allows light with a specific wavelength to pass, such that it can filter unneeded light. For example, the red light filter layer CL_r in the light filter layer CL only allows red light to pass, thus the R pixel PI_r only receives the red light. Similarly, the blue light filter layer CL_b in the light filter layer CL only allows the blue light to pass, thus the B pixie PI_b only receives the blue light. The micro lens layer L_m, which comprises the micro lenses L_m1, L_m2 in FIG. 2, is applied to extract light to the pixel matrix PIM.

Please note, the claim scope of the present invention is not limited to the pixels in an arrangement depicted in FIG. 3, and is not limited to the structure for the image sensor 400 depicted in FIG. 4. Besides, the claim scope of the present invention is not limited to one type pixel or two types of pixels. For example, in the embodiment of FIG. 5, G pixels (green pixel) PI_g1, PI_g2 are further included besides R pixels and B pixels. Similar with the R pixels and the B pixels, the G pixels are classified into a first group of G pixels PI_g1 and a second group of G pixels PI_g2 (only some of them are marked by symbols). Left half parts of the first group of G pixels PI_g1 are blocked, thus only right half parts thereof can sense images. On the opposite, right half parts of the second group of G pixels PI_g2 are blocked, thus only left half parts thereof can sense images. The first group of G pixels PI_g1 generates a fifth image, and the second group of G pixels PI_g2 generates a sixth image. The fifth image and the sixth image can be combined to generate a third combined image, which can be applied to compute third distance information.

Figure 5:
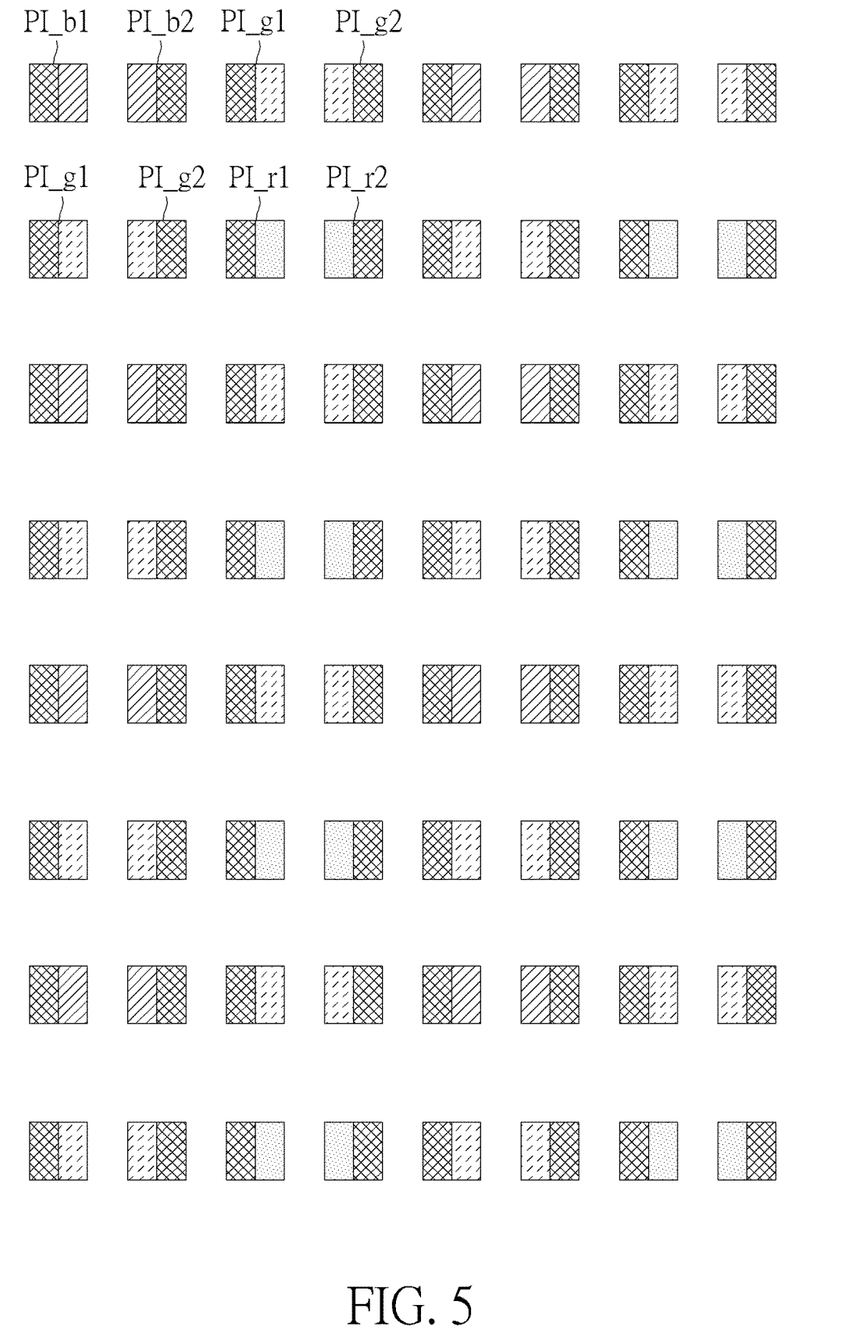
FIG. 5 and FIG. 6 are schematic diagrams illustrating computing an object distance via "phase detection", according to another embodiment of the present invention.
Figure 6:
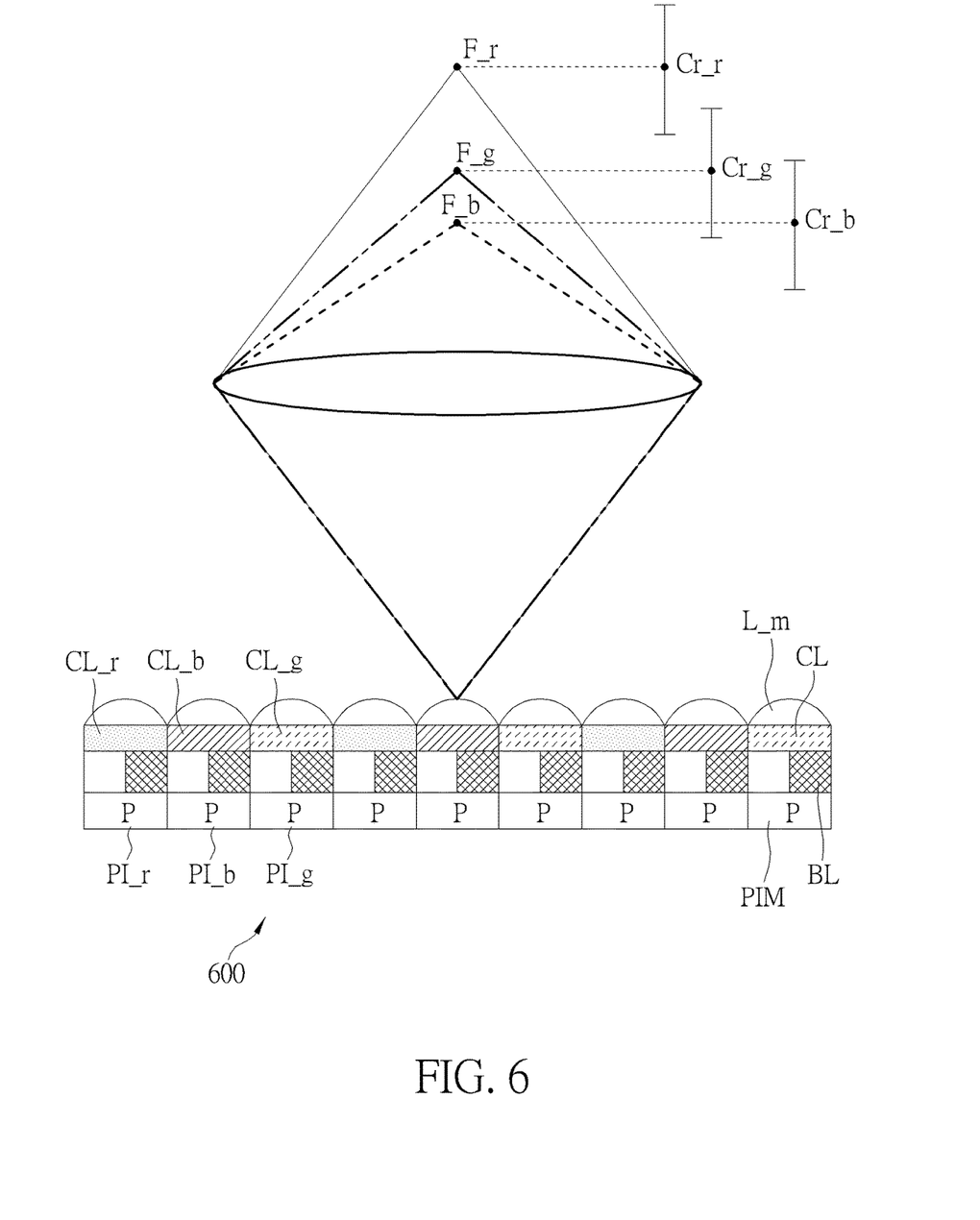

FIG. 6 is a schematic diagram illustrating a structure for an image sensor 600 corresponding to FIG. 5. As depicted in FIG. 6, the image sensor 600 also comprises a pixel matrix PIM, a block layer BL, a light filter layer CL and a micro lens layer L_m. Comparing with FIG. 4, the block layer BL for the image sensor 600 further comprises green light filter layer CL_g, which only allows green light to pass. Accordingly, the G pixel PI_g only receives green light. Functions for other layers for the image sensor 600 are the same as which of the embodiment depicted in FIG. 4, thus descriptions thereof are omitted for brevity here. As depicted in FIG. 6, the focus points of red light, green light and blue light are respectively located at F_r, F_g, F_b, which respectively have computable ranges Cr_r, Cr_g and Cr_b. Accordingly, the distance for the object can be computed once the object is located in any one of the computable ranges Cr_r, Cr_g and Cr_b. By this way, the computable range is larger than which of FIG. 3.

In the embodiment of FIG. 6, any one of the first distance information generated by R pixels, the second distance information generated by B pixels, and the third distance information generated by G pixels can be selected as a basement for determining a distance between the object and the image sensor. In one embodiment, a compensation level for compensating the first combined image to a clear image, a compensation level for compensating the second combined image to a clear image and a compensation level for compensating the third combined image to a clear image are respectively acquired, and the first distance information, the second distance information or the third distance information is selected as a basement for determining a distance between the object and the image sensor according to the compensation levels. That is, the first distance information, the second information or the third distance information is selected as the basement according to blur levels for the first combined image, the second combined image and the third combined image.

Figure 7:
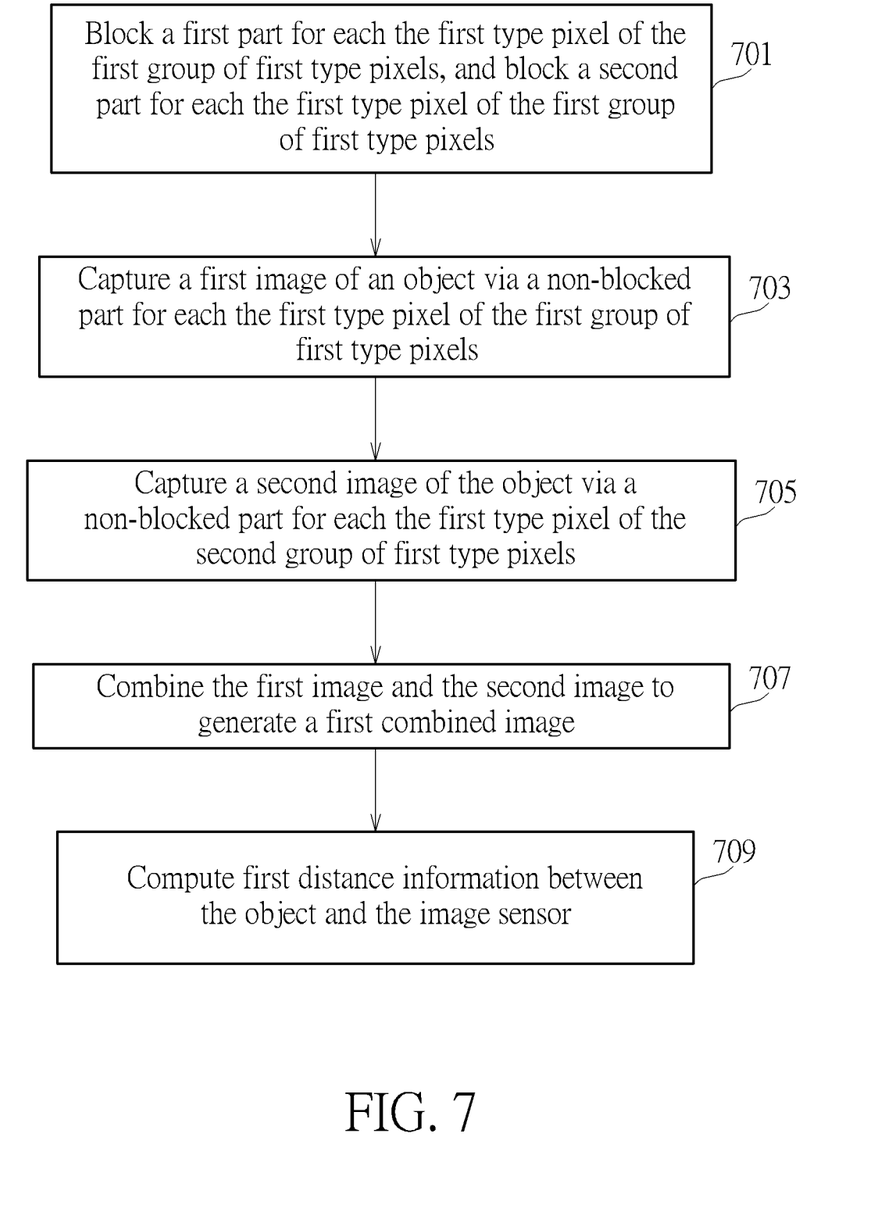
FIG. 7 is a flow chart illustrating an object distance computing method according to one embodiment of the present invention.

FIG. 7 is a flow chart illustrating an object distance computing method according to one embodiment of the present invention, which is applied to an image sensor (for example, 400 in FIG. 4 or 600 in FIG. 6). The image sensor comprises a plurality of first type pixels (ex. R pixel). The first type pixels comprise a first group of first type pixels (ex. PI_r1 in FIG. 4) and a second group of first type pixels (ex. PI_r2 in FIG. 4). The object distance computing method comprises following steps:

Step 701

Block a first part (ex. left half part) for each the first type pixel of the first group of first type pixels, and block a second part (ex. right half part) for each the first type pixel of the first group of first type pixels.

Step 703

Capture a first image of an object via a non-blocked part for each the first type pixel of the first group of first type pixels.

Step 705

Capture a second image of the object via a non-blocked part for each the first type pixel of the second group of first type pixels.

Step 707

Combine the first image and the second image to generate a first combined image.

Step 709

Compute first distance information between the object and the image sensor, according to at least one blur level for at least one of the first image, the second image and a first combined image generated by combining the first image and the second image.

The embodiment depicted in FIG. 7 can apply pixels for more than types to compute distance information as depicted in FIGS. 3-6, rather than apply pixels for only one type, thereby the computable range can be extended. Related steps can be acquired in view of above-mentioned embodiments, thus are omitted for brevity here. The pixels for more than types can be, for example, the above-mentioned R pixels, G pixels, and B pixels (for receiving light with different wavelengths), but can be pixels for other types.

Figure 8:
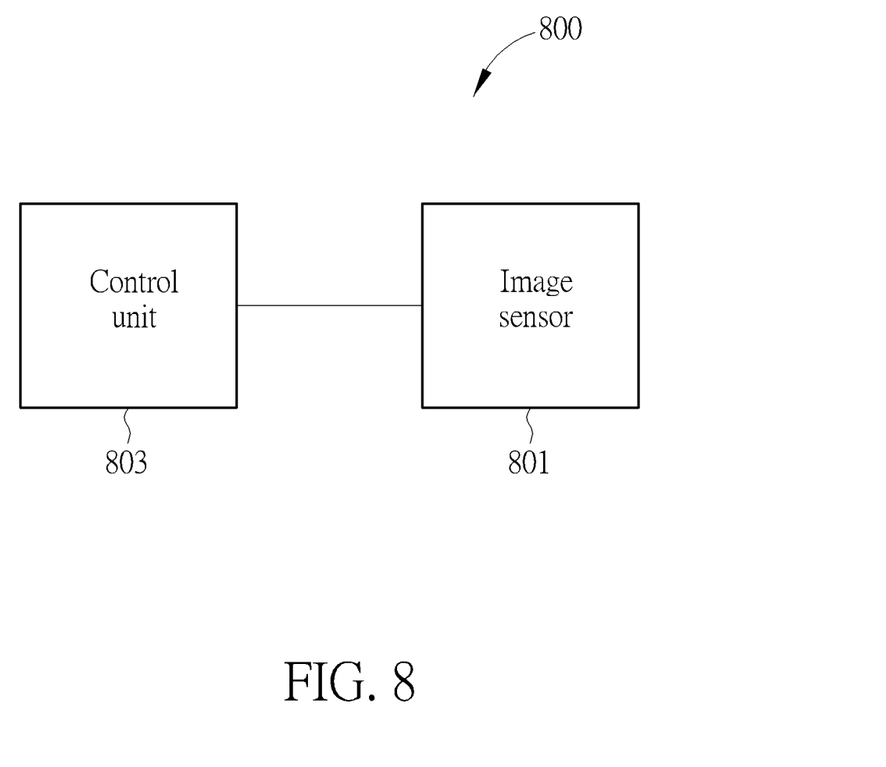
FIG. 8 illustrates an object distance apparatus according to one embodiment of the present invention.

FIG. 8 illustrates an object distance apparatus according to one embodiment of the present invention. As depicted in FIG. 8, the object distance computing apparatus 800 comprises an image sensor 801 and a control unit 803. The image sensor 801 comprises the structures depicted in FIG. 3 or FIG. 5, the control unit 803 is applied to perform steps for computing distance information which are disclosed in above-mentioned embodiments. Please note, the image sensor 801 is not limited to structures depicted in FIG. 3 or FIG. 5. For example, the lens layer can be removed and the pixel can acquired necessary light without using the light filter layer. Accordingly, the object distance computing apparatus according to the present invention can be summarized as below: An object distance computing apparatus comprising an image sensor and a control unit (ex. 801 and 803 in FIG. 8). The image sensor comprises: a plurality of first type pixels (ex. R pixels in FIG. 4), comprising a first group of first type pixels and a second group of first type pixels; and a block layer (ex. BL in FIG. 4), configured to block a first part for each the first type pixel of the first group of first type pixels, and blocking a second part for each the first type pixel of the first group of first type pixels. The image sensor captures a first image of an object via a non-blocked part for each the first type pixel of the first group of first type pixels, captures a second image of the object via a non-blocked part for each the first type pixel of the second group of first type pixels, and combines the first image and the second image to generate a first combined image. The control unit computes first distance information between the object and the image sensor according to at least one blur level for at least one of the first image, the second image and a first combined image generated by combining the first image and the second image.

Figure 9:
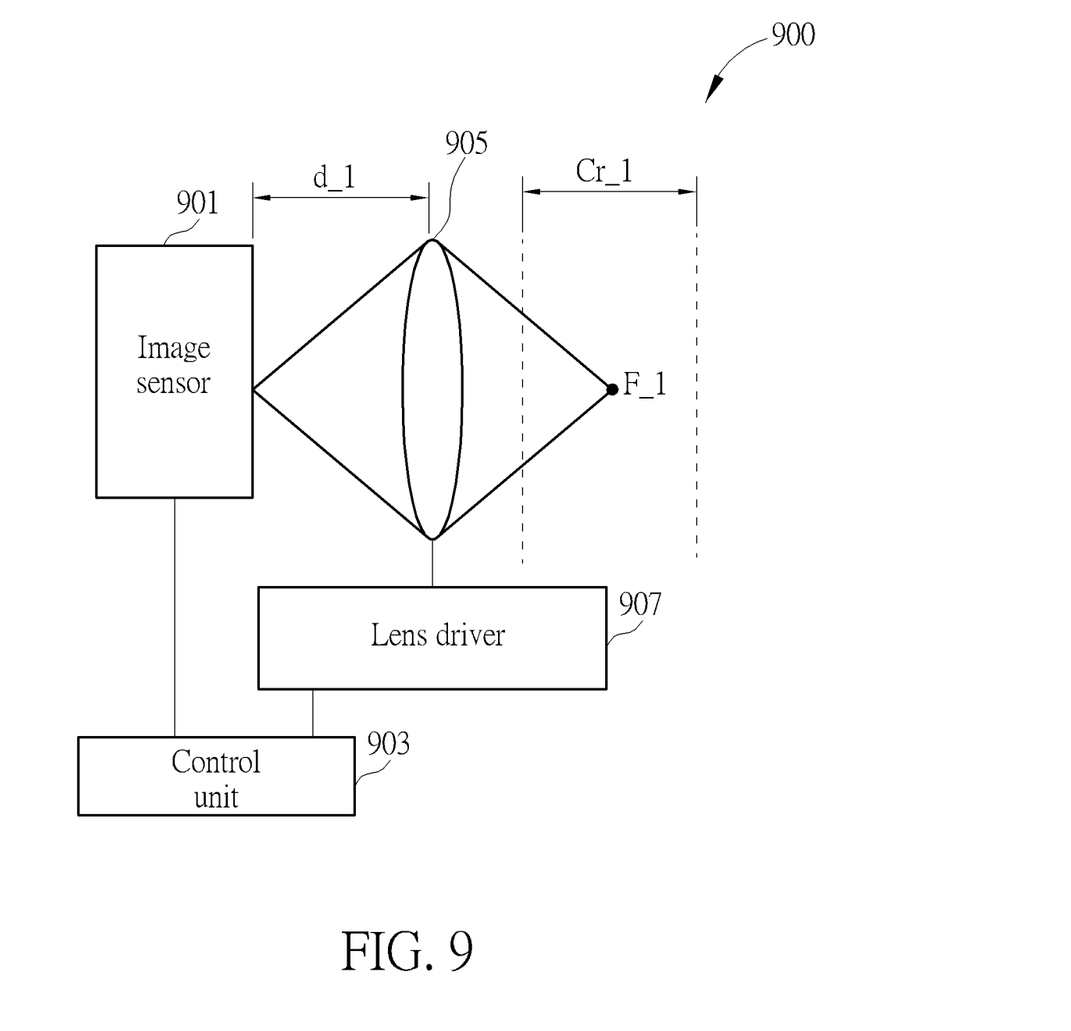
FIG. 9 and FIG. 10 are schematic diagrams illustrating an object distance computing apparatus according to another embodiment of the present invention.
Figure 10:
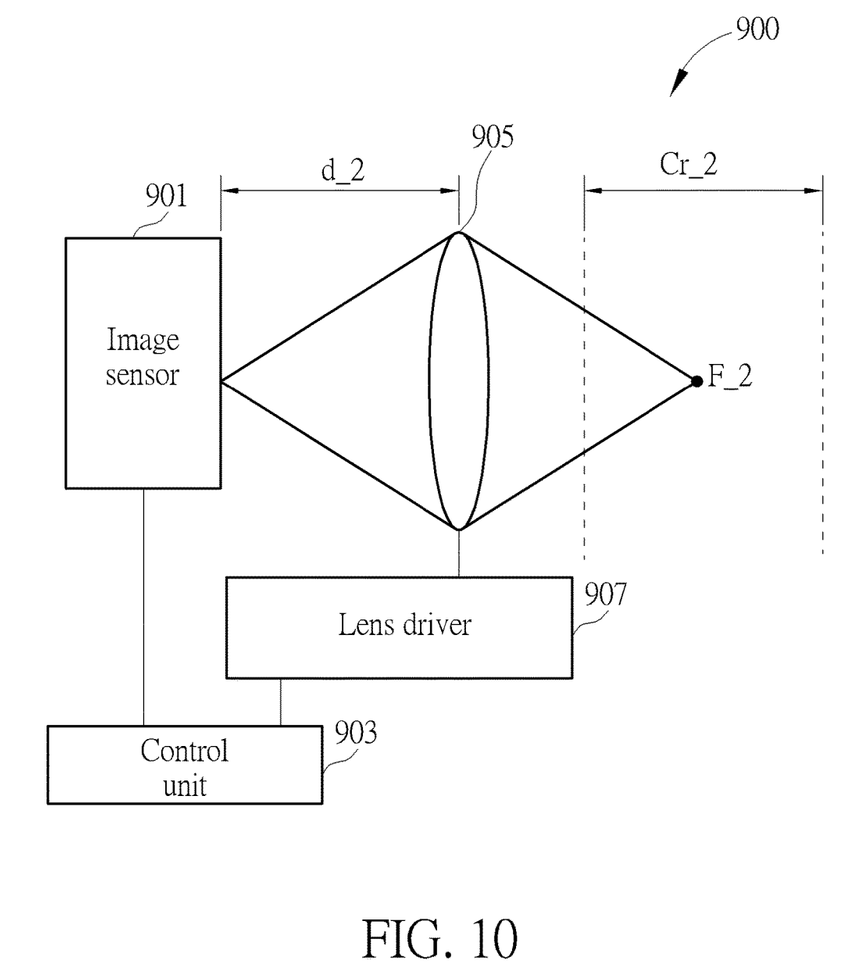

Besides the above-mentioned embodiment, the computable range can still be extended even if only one type of pixel is applied. FIG. 9 and FIG. 10 are schematic diagrams illustrating an object distance computing apparatus according to another embodiment of the present invention. Please refer to FIG. 9, the object distance computing apparatus 900 further comprises a movable lens 905 and a lens driver 907 besides the image sensor 901 and the control unit 903. The image sensor 901 comprises the structures depicted in FIG. 3 or FIG. 5. That is, the pixels are classified into a first group and a second group, and different parts for different groups of pixels are blocked. Please note, the image sensor 901 can comprise one or more than one types of pixels. The lens driver 907 is applied to adjust a location of the movable lens 905. The image sensor 901 captures object images with different phases via the movable lens 905, and generates a combined image according to these images. The control unit 903 computes distance information for the object according to a blur level of the combined image, as above-mentioned.

In the example of FIG. 9, the distance between the movable lens 905 and the image sensor 901 is d_1, the focus point is F_1, and the computable range is Cr_1. Accordingly, if the object is located outside the computable range Cr_1, the image is too blurred such that the control unit 903 cannot compute the distance for the object. In such case, the control unit 903 sends a command to the lens driver 907 to control the lens driver 907 to move the movable lens 905. For example, in the example of FIG. 10, the movable lens 905 is moved to a location having a distance d_2 away from the image sensor 901. The focus point is changed to F_2, and the computable rage is changed to Cr_2. In this case, the image sensor 901 captures object images with different phases via the movable lens 905, and generates the combined image according to these images. The control unit 903 computes distance information for the object according to a blur level of the combined image, as above-mentioned. The location for the movable lens 905 can be kept the same if the combined image acquired in FIG. 10 is clear enough to compute distance information. However, if the combined image acquired in FIG. 10 is still too blurred such that the distance information cannot be acquired, above-mentioned steps will be repeated to move the movable lens 905 to acquire a clear combined image. Via the steps depicted in FIG. 9 and FIG. 10, the movable lens can be continuously moved to change the focus point, thereby the computable range can be extended.

Please note, in the above-mentioned embodiments the movable lens is adjusted only when the combined image is too blurred such that the distance information cannot be acquired. However, the claim scope of the present invention is not limited to such situation. For example, the control unit can move the movable lens once a blurred level for the combined image is over a predetermined level, no matter the distance information can be computed or not. By this way, wrong distance information can be avoided. Alternatively, a plurality of distance information can be acquired via moving the movable lens 905. After that, an average for the distance information is computed. By this way, the distance information can be more accurate. Accordingly, the embodiments depicted in FIG. 9 and FIG. 10 can be regarded as an example for moving the movable lens according to a blurred level of the combined image.

Please note, in the above-mentioned embodiments, the image sensor 901 comprises structures depicted in FIG. 3 and FIG. 5, but does not mean to limit the scope of the present invention. In one embodiment, the image sensor 901 comprises normal pixels, that is, no part of the pixels is blocked. In such case, operations for the devices in FIG. 9 can be illustrated as below: The image sensor 901 has a first distance d1 away from the movable lens 905. The image sensor 901 captures a first sensing image of an object via the movable lens 905. Please note, the first sensing image is not the combined image illustrated in above-mentioned embodiments. The control unit 903 computes first distance information between the object and the image sensor 901 according to a blur level of the first sensing image. The control unit 903 further controls the lens driver 907 to adjust a location of the movable lens 905 according to the blur level of the first sensing image such that a distance between the movable lens 905 and the image sensor 901 is a second distance d2 (the situation depicted in FIG. 10). The control unit 903 controls the image sensor 901 to capture a second sensing image of the object via the movable lens, and computes second distance information between the object and the image sensor according to a blur level of the second sensing image.

Similar with above-mentioned embodiments, the movable lens can be moved if the first sensing image is too blurred for computing distance information. Alternatively, the movable lens can be moved if a blur level of the first sensing image is larger than a predetermined level, no matter the distance information can be computed or not. By this way, wrong distance information can be avoided. Alternatively, a plurality of distance information can be acquired via moving the movable lens 905. After that, an average for the distance information is computed. By this way, the distance information can be more accurate.

In view of above-mentioned embodiments, the present invention applies the conventional focus mechanism to compute a distance. By this way, the distance information for the object can be computed without other devices and other complicated computing. Additionally, the computable range for the object distance information can be extended if more than one type of pixels are applied to compute distance information. Further, the computable range for the object distance information can be extended if the location for the movable lens is adjusted according to a blur level for the image.

Those skilled in the art will readily observe that numerous modifications and alterations of the apparatus and method may be made while retaining the teachings of the invention. Accordingly, the above disclosure should be construed as limited only by the metes and bounds of the appended claims.

What is claimed is:

1. An object distance computing method, applied to an image sensor comprising a plurality of first type pixels, wherein the first type pixels comprises a first group of first type pixels and a second group of first type pixels, wherein the object distance computing method comprises:
   blocking a first part for each the first type pixel of the first group of first type pixels, and blocking a second part for each the first type pixel of the first group of first type pixels;
   capturing a first image of an object via a non-blocked part for each the first type pixel of the first group of first type pixels;
   capturing a second image of the object via a non-blocked part for each the first type pixel of the second group of first type pixels; and
   computing first distance information between the object and the image sensor, according to at least one blur level for at least one of the first image, the second image and a first combined image generated by combining the first image and the second image.

2. The object distance computing method of claim 1, wherein the image sensor comprises a plurality of second type pixels, wherein the second type pixels comprises a first group of second type pixels and a second group of second type pixels, wherein the object distance computing method comprises:
   blocking a first part for each the second type pixel of the first group of second type pixels, and blocking a second part for each the second type pixel of the second group of second type pixels;
   capturing a third image of an object via a non-blocked part for each the second type pixel of the first group of second type pixels;
   capturing a fourth image of the object via a non-blocked part for each the second type pixel of the second group of second type pixels;
   combining the third image and the fourth image to generate a second combined image; and
   computing second distance information between the object and the image sensor, according to a blur level for the second combined image.

3. The object distance computing method of claim 2, wherein light sensed by the first type pixels and light sensed the second type pixels have different wave lengths.

4. The object distance computing method of claim 2, further comprising:
   determining which one of the first distance information and the second distance information should be applied as the basement for determining a distance between the object and the image sensor according to a blur level of the first combined image and the second combined image.

5. The object distance computing method of claim 2, wherein the image sensor comprises a plurality of third type pixels, wherein the third type pixels comprises a first group of third type pixels and a second group of third type pixels, wherein the object distance computing method comprises:
   blocking a first part for each the third type pixel of the first group of third type pixels, and blocking a second part for each the third type pixel of the second group of third type pixels;
   capturing a fifth image of the object via a non-blocked part for each the third type pixel of the first group of third type pixels;
   capturing a sixth image of the object via a non-blocked part for each the third type pixel of the second group of third type pixels;
   combining the fifth image and the sixth image to generate a third combined image; and
   computing third distance information between the object and the image sensor, according to a blur level for the third combined image.

6. The object distance computing method of claim 5, further comprising:
   determining which one of the first distance information, the second distance information and the third distance information should be applied as the basement for determining a distance between the object and the image sensor according to a blur level of the first combined image, the second combined image and the third combined image.

7. The object distance computing method of claim 1, wherein the first part is a half part of the first type pixel, wherein the second part is the other half part of the first type pixel, which is different from the first part.

8. An object distance computing apparatus, comprising:
   an image sensor, comprising:
      a plurality of first type pixels, comprising a first group of first type pixels and a second group of first type pixels; and
      a block layer, configured to block a first part for each the first type pixel of the first group of first type pixels, and configured to block a second part for each the first type pixel of the first group of first type pixels;
      wherein the image sensor captures a first image of an object via a non-blocked part for each the first type pixel of the first group of first type pixels, captures a second image of the object via a non-blocked part for each the first type pixel of the second group of first type pixels, and combines the first image and the second image to generate a first combined image; and
   a control unit, configured to compute first distance information between the object and the image sensor according to at least one blur level for at least one of the first image, the second image and a first combined image generated by combining the first image and the second image.

9. The object distance computing apparatus of claim 8, wherein the image sensor comprises a plurality of second type pixels, wherein the second type pixels comprises a first group of second type pixels and a second group of second type pixels, wherein the control unit is further configured to perform following steps:
   blocking a first part for each the second type pixel of the first group of second type pixels, and blocking a second part for each the second type pixel of the second group of second type pixels;
   capturing a third image of an object via a non-blocked part for each the second type pixel of the first group of second type pixels;
   capturing a fourth image of the object via a non-blocked part for each the second type pixel of the second group of second type pixels;
   combining the third image and the fourth image to generate a second combined image; and computing second distance information between the object and the image sensor, according to a blur level for the second combined image.

10. The object distance computing apparatus of claim 9, wherein light sensed by the first type pixels and light sensed the second type pixels have different wave lengths.

11. The object distance computing apparatus of claim 9, wherein the control unit further determines which one of the first distance information and the second distance information should be applied as the basement for determining a distance between the object and the image sensor according to a blur level of the first combined image and the second combined image.

12. The object distance computing apparatus of claim 9, wherein the image sensor comprises a plurality of third type pixels, wherein the third type pixels comprises a first group of third type pixels and a second group of third type pixels, wherein the control unit is further configured to perform following steps:

blocking a first part for each the third type pixel of the first group of third type pixels, and blocking a second part for each the third type pixel of the second group of third type pixels;

capturing a fifth image of the object via a non-blocked part for each the third type pixel of the first group of third type pixels;

capturing a sixth image of the object via a non-blocked part for each the third type pixel of the second group of third type pixels;

combining the fifth image and the sixth image to generate a third combined image; and computing third distance information between the object and the image sensor, according to a blur level for the third combined image.

13. The object distance computing apparatus of claim 12, wherein the control unit determines which one of the first distance information, the second distance information and the third distance information should be applied as the basement for determining a distance between the object and the image sensor according to a blur level of the first combined image, the second combined image and the third combined image.

14. The object distance computing apparatus of claim 8, wherein the first part is a half part of the first type pixel, wherein the second part is the other half part of the first type pixel, which is different from the first part.

* * * * *